United States Patent [19]

Matsumoto

[11] Patent Number: 4,827,526
[45] Date of Patent: May 2, 1989

[54] IMAGE INFORMATION DETECTING/PROCESSING METHOD

[75] Inventor: Fumio Matsumoto, Tokyo, Japan

[73] Assignee: Fuji Photo Film Co., Ltd., Kanagawa, Japan

[21] Appl. No.: 849,678

[22] Filed: Apr. 9, 1986

[30] Foreign Application Priority Data

Apr. 16, 1985 [JP] Japan ................................. 60-79407
Aug. 26, 1985 [JP] Japan ................................ 60-185792

[51] Int. Cl.⁴ .......................................... G06K 9/00
[52] U.S. Cl. .......................................... 382/1; 355/77; 358/287
[58] Field of Search ................. 382/1; 356/389, 390, 356/394, 443; 358/297; 355/77

[56] References Cited

U.S. PATENT DOCUMENTS

| | | | |
|---|---|---|---|
| 3,858,983 | 1/1975 | Foster et al. | 356/390 |
| 4,260,244 | 4/1981 | Laska et al. | 355/77 |
| 4,286,868 | 9/1981 | Laska | 355/68 |
| 4,397,545 | 8/1983 | Terashita | 355/77 |
| 4,542,829 | 9/1985 | Emery et al. | 356/394 |
| 4,589,766 | 5/1986 | Fürsich et al. | 355/77 |
| 4,610,537 | 9/1986 | Matsumoto | 355/68 |
| 4,630,225 | 12/1986 | Hisano | 356/394 |
| 4,641,198 | 2/1987 | Ohta et al. | 358/287 |
| 4,650,316 | 3/1987 | Matsumoto | 355/68 |
| 4,653,900 | 3/1987 | Kito et al. | 355/29 |
| 4,659,213 | 4/1987 | Matsumoto | 355/77 |
| 4,660,965 | 4/1987 | Matsumoto | 355/68 |
| 4,661,985 | 4/1987 | Akutsu | 382/1 |
| 4,666,306 | 5/1987 | Matsumoto | 356/404 |
| 4,667,245 | 5/1987 | Matsumoto et al. | 358/214 |

*Primary Examiner*—Leo H. Boudreau
*Assistant Examiner*—Jose L. Couso
*Attorney, Agent, or Firm*—Wenderoth, Lind & Ponack

[57] ABSTRACT

It is necessary to photometrically measure density of an original film in order to determine its printing exposure value or correction value in photographic printing. It also is necessary to correctly recognize the size and the transporting direction of the original film. The method in accordance with the present invention enables the discrimination of the size and the transporting direction of the original film, and the processing of image signals to thereby achieve detection of images and the printing thereof at a high efficiency. An original film is illuminated and light from an aperture of a film carrier is received by an image sensor. Detected image information on a whole area of the aperture in segmented pixels are compared with corresponding stored information and the size and transportation direction of the original film is discriminated based on the comparison.

15 Claims, 11 Drawing Sheets

| 145 | 136 | 120 | 123 | 128 | 135 | 136 | 140 | 153 | 150 |
|---|---|---|---|---|---|---|---|---|---|
| 150 | 142 | 119 | 120 | 125 | 127 | 129 | 133 | 142 | 152 |
| 155 | 148 | 49 | 53 | 52 | 60 | 58 | 17 | 130 | 158 |
| 152 | 150 | 35 | 13 | 14 | 15 | 15 | 8 | 126 | 157 |
| 153 | 152 | 31 | 0 | 0 | 0 | 0 | 4 | 120 | 156 |
| 155 | 147 | 29 | 0 | 0 | 0 | 0 | 3 | 115 | 155 |
| 157 | 145 | 31 | 0 | 0 | 0 | 0 | 1 | 108 | 152 |
| 155 | 150 | 34 | 12 | 14 | 14 | 18 | 24 | 110 | 155 |
| 150 | 148 | 42 | 45 | 52 | 54 | 65 | 73 | 120 | 153 |
| 145 | 150 | 108 | 110 | 115 | 118 | 126 | 130 | 132 | 152 |
| 143 | 152 | 155 | 157 | 160 | 160 | 155 | 150 | 145 | 150 |

FIG. 6B

| 32 | 36 | 35 | 33 | 31 | 37 | 36 | 37 | 35 | 40 |
|---|---|---|---|---|---|---|---|---|---|
| 30 | 5 | 4 | 3 | 2 | 5 | 4 | 6 | 8 | 42 |
| 33 | 0 | 0 | 0 | 0 | 0 | 0 | 0 | 0 | 39 |
| 34 | 0 | 0 | 0 | 0 | 0 | 0 | 0 | 0 | 37 |
| 35 | 0 | 0 | 0 | 0 | 0 | 0 | 0 | 0 | 36 |
| 36 | 0 | 0 | 0 | 0 | 0 | 0 | 0 | 0 | 37 |
| 36 | 0 | 0 | 0 | 0 | 0 | 0 | 0 | 0 | 39 |
| 35 | 0 | 0 | 0 | 0 | 0 | 0 | 0 | 0 | 40 |
| 34 | 0 | 0 | 0 | 0 | 0 | 0 | 0 | 0 | 42 |
| 35 | 7 | 6 | 5 | 5 | 6 | 5 | 4 | 6 | 43 |
| 36 | 38 | 39 | 40 | 42 | 44 | 43 | 42 | 40 | 42 |

| 145 | 145 | 143 | 144 | 140 | 138 | 137 | 135 | 135 | 137 | 140 | 140 | 142 | 145 | 145 | 147 | 148 | 150 | 150 | 151 |
|---|---|---|---|---|---|---|---|---|---|---|---|---|---|---|---|---|---|---|---|
| 146 | 145 | 142 | 143 | 144 | 148 | 150 | 151 | 150 | 146 | 148 | 143 | 140 | 130 | 138 | 140 | 145 | 151 | 152 | 153 |
| 150 | 146 | 140 | 141 | 142 | 138 | 128 | 126 | 36 | 135 | 136 | 137 | 140 | 141 | 143 | 145 | 146 | 147 | 144 | 140 |
| 148 | 143 | 140 | 48 | 53 | 52 | 41 | 82 | 85 | 70 | 50 | 110 | 121 | 115 | 95 | 43 | 38 | 146 | 140 | 140 |
| 145 | 141 | 138 | 55 | 54 | 50 | 42 | 83 | 90 | 68 | 62 | 120 | 125 | 108 | 87 | 48 | 35 | 143 | 141 | 141 |
| 143 | 141 | 137 | 57 | 60 | 48 | 48 | 74 | 100 | 110 | 120 | 40 | 118 | 105 | 82 | 46 | 33 | 142 | 143 | 141 |
| 144 | 143 | 136 | 63 | 68 | 40 | 45 | 72 | 111 | 113 | 141 | 39 | 115 | 99 | 74 | 47 | 30 | 143 | 141 | 141 |
| 144 | 144 | 139 | 65 | 69 | 36 | 40 | 68 | 95 | 85 | 63 | 145 | 110 | 98 | 70 | 50 | 28 | 147 | 145 | 145 |
| 142 | 145 | 120 | 70 | 73 | 35 | 36 | 65 | 92 | 46 | 65 | 40 | 99 | 94 | 73 | 54 | 27 | 140 | 146 | 145 |
| 138 | 46 | 121 | 72 | 85 | 33 | 35 | 62 | 84 | 48 | 72 | 70 | 95 | 90 | 75 | 58 | 25 | 140 | 145 | 145 |
| 137 | 144 | 123 | 80 | 81 | 38 | 37 | 56 | 73 | 48 | 98 | 63 | 90 | 91 | 60 | 55 | 29 | 140 | 147 | 147 |
| 135 | 143 | 138 | 139 | 138 | 137 | 137 | 135 | 135 | 140 | 141 | 142 | 143 | 144 | 145 | 146 | 147 | 147 | 148 | 148 |
| 140 | 142 | 140 | 139 | 138 | 138 | 137 | 135 | 135 | 140 | 142 | 143 | 144 | 144 | 145 | 146 | 147 | 147 | 148 | 148 |
| 141 | 142 | 145 | 145 | 145 | 145 | 145 | 146 | 146 | 146 | 146 | 146 | 147 | 147 | 147 | 145 | 145 | 145 | 144 | 144 |

FIG. 13B

| 145 | 145 | 143 | 144 | 140 | 138 | 137 | 135 | 135 | 137 | 140 | 140 | 142 | 145 | 145 | 147 | 148 | 150 | 150 | 151 |
|---|---|---|---|---|---|---|---|---|---|---|---|---|---|---|---|---|---|---|---|
| 146 | 145 | 142 | 143 | 144 | 148 | 150 | 151 | 150 | 146 | 148 | 143 | 140 | 130 | 138 | 140 | 145 | 151 | 152 | 153 |
| 150 | 146 | 140 | 141 | 142 | 138 | 128 | 126 | 130 | 135 | 136 | 137 | 140 | 141 | 143 | 145 | 146 | 147 | 144 | 140 |
| 148 | 143 | 140 | 75 | 77 | 48 | 55 | 64 | 66 | 74 | 45 | 29 | 34 | 63 | 75 | 25 | 33 | 146 | 140 | 140 |
| 145 | 142 | 138 | 32 | 68 | 51 | 44 | 65 | 71 | 68 | 43 | 27 | 33 | 75 | 82 | 48 | 35 | 143 | 141 | 141 |
| 143 | 141 | 137 | 28 | 62 | 56 | 62 | 77 | 85 | 55 | 39 | 24 | 38 | 77 | 77 | 55 | 42 | 142 | 143 | 141 |
| 144 | 143 | 136 | 46 | 60 | 63 | 73 | 82 | 94 | 54 | 36 | 22 | 47 | 82 | 84 | 56 | 55 | 143 | 141 | 141 |
| 144 | 144 | 139 | 45 | 55 | 72 | 85 | 98 | 92 | 49 | 37 | 20 | 51 | 84 | 101 | 58 | 50 | 147 | 145 | 145 |
| 142 | 145 | 120 | 43 | 34 | 85 | 90 | 110 | 90 | 46 | 35 | 18 | 55 | 88 | 121 | 62 | 42 | 140 | 146 | 145 |
| 138 | 146 | 121 | 52 | 30 | 90 | 82 | 108 | 84 | 43 | 42 | 25 | 57 | 95 | 135 | 65 | 40 | 140 | 145 | 145 |
| 137 | 144 | 123 | 29 | 29 | 110 | 77 | 105 | 85 | 42 | 44 | 29 | 62 | 110 | 130 | 63 | 40 | 140 | 147 | 147 |
| 135 | 143 | 138 | 139 | 138 | 137 | 137 | 135 | 135 | 140 | 141 | 142 | 143 | 144 | 145 | 146 | 147 | 147 | 148 | 148 |
| 140 | 142 | 140 | 139 | 138 | 138 | 137 | 135 | 135 | 140 | 142 | 143 | 144 | 144 | 145 | 146 | 147 | 147 | 148 | 148 |
| 141 | 142 | 145 | 145 | 145 | 145 | 145 | 146 | 146 | 146 | 146 | 146 | 147 | 147 | 147 | 145 | 145 | 145 | 144 | 144 |

FIG. 13C

| 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | -27 | -24 | 4 | -14 | 18 | 19 | -4 | 13 | 81 | 87 | 52 | 20 | 18 | 5 | 0 | 0 | 0 |
| 0 | 0 | 0 | 23 | -14 | -1 | -2 | 18 | 19 | 0 | 19 | 93 | 92 | 33 | 5 | 0 | 0 | 0 | 0 | 0 |
| 0 | 0 | 0 | 29 | -2 | -8 | -14 | -3 | 15 | 55 | 81 | 16 | 80 | 28 | 5 | -9 | -9 | 0 | 0 | 0 |
| 0 | 0 | 0 | -17 | 8 | -23 | -28 | -10 | 17 | 59 | 105 | 17 | 68 | 17 | -10 | -9 | -25 | 0 | 0 | 0 |
| 0 | 0 | 0 | 20 | 14 | -36 | 45 | -30 | 3 | 36 | 26 | 25 | 59 | 14 | -31 | -8 | -22 | 0 | 0 | 0 |
| 0 | 0 | 0 | 27 | 39 | -50 | -54 | -45 | 2 | 0 | 30 | 122 | 44 | 6 | -48 | -8 | -15 | 0 | 0 | 0 |
| 0 | 0 | 0 | 20 | 55 | -57 | -47 | -46 | 0 | 5 | 30 | 45 | 38 | -15 | -60 | -7 | -18 | 0 | 0 | 0 |
| 0 | 0 | 0 | 51 | 52 | -72 | -40 | -49 | -12 | 6 | 54 | 34 | 28 | -19 | -70 | -8 | -11 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 |

| 145 | 145 | 143 | --- | | | | | | | | | | | | |
|---|---|---|---|---|---|---|---|---|---|---|---|---|---|---|---|
| 146 | 145 | | | | | | | | | | | | | | |
| 150 | | | | | | | | | | | | | | | |
| | | | 145 | 143 | 142 | 140 | | | | | | | | | |
| | | | 144 | 55 | 47 | | | | | | | | | | |
| | | | 143 | 58 | 45 | 43 | 40 | | | | | | | | |
| | | | 142 | 62 | 44 | 42 | | | | | | | | | |
| | | | | 65 | 38 | 36 | | | | | | | | | |
| | | | | 70 | | | | | | | | | | | |
| | | | | 71 | | | | | | | | | | | |

| | | | | | | | | | | | | | | | | | | |
|---|---|---|---|---|---|---|---|---|---|---|---|---|---|---|---|---|---|---|
| 0 | 0 | 0 | --- | | | | | | | | | | | | | | | |
| 0 | 0 | | | | | | | | | | | | | | | | | |
| 0 | | | | | | | | | | | | | | | | | | |
| | | 0 | 0 | 0 | --- | | | | | | | | | | | | | |
| | | 0 | 0 | 0 | 0 | --- | | | | | | | | | | | | |
| | | 0 | -20 | 13 | -8 | --- | | | | | | | | | | | | |
| | | | -18 | 0 | 5 | | | | | | | | | | | | | |
| | | | 15 | -4 | | | | | | | | | | | | | | |

| | | | | | | | | | | | | | | | | | | | | |
|---|---|---|---|---|---|---|---|---|---|---|---|---|---|---|---|---|---|---|---|---|
| | | | | | | | | 0 | 0 | | | | | | | | | | | |
| | | | | | | | | 0 | 0 | | | | | | | | | | | |
| | | | | | | | | 0 | 0 | | | | | | | | | | | |
| | | | | | | | | 1 | 1 | | | | | | | | | | | |
| | | | | | | | | 0 | 1 | | | | | | | | | | | |
| | | | | | | | | 1 | 1 | | | | | | | | | | | |
| 0 | 0 | 0 | 1 | 1 | 1 | 1 | 1 | 1 | 1 | 1 | 1 | 1 | 1 | 1 | 1 | 1 | 0 | 0 | 0 | |
| 0 | 0 | 0 | 1 | 1 | 1 | 1 | 1 | 1 | 1 | 1 | 1 | 1 | 1 | 1 | 1 | 1 | 0 | 0 | 0 | |
| | | | | | | | | 0 | 1 | | | | | | | | | | | |
| | | | | | | | | 1 | 1 | | | | | | | | | | | |
| | | | | | | | | 1 | 1 | | | | | | | | | | | |
| | | | | | | | | 0 | 0 | | | | | | | | | | | |
| | | | | | | | | 0 | 0 | | | | | | | | | | | |
| | | | | | | | | 0 | 0 | | | | | | | | | | | |

PH

IMAGE INFORMATION DETECTING/PROCESSING METHOD

BACKGROUND OF THE INVENTION

This invention relates to an image information detecting/processing method which is capable of detecting the pixel information on pixels of a whole frame on an original film such as a film negative, the frame being segmented into a large number of pixels, and automatically detecting the size and advancing direction of the frame by comparing the information with stored information of adjacent frames or of a reference frame so as to enable the use of a common operational expression for determining the exposure value.

It is necessary to photometrically measure the density of an original film such as a film negative sheet in order to determine the printing exposure value or the correction value thereof in a photographic printing system. In the prior art, the film negative is measured with respect to its LATD (Large Area Transmittance Density) by means of photosensors such as photodiodes provided near an optical path in the photographic printing system. The LATD method, however, is an image detection to photographically measure the film negative generally but is not a method to measure the image density of a film negative correctly or across the whole frame. The printing exposure value or correction value obtained by the LATD method therefore does not quite meet strict requirements. When the film negative is printed on a photographic paper, it is necessary to change exposure value or correction amount depending on the size, manufacturer or sensitivity of the film negative due to the difference in light diffusion particular to each film. These differences are conventionally observed and discriminated macroscopically and inputted manually from a keyboard or discriminated by a separate device, and signals thereof are read out from an information transmission medium. Such key manipulation or signal processing is not only cumbersome but susceptible to errors in input.

Figure 1:
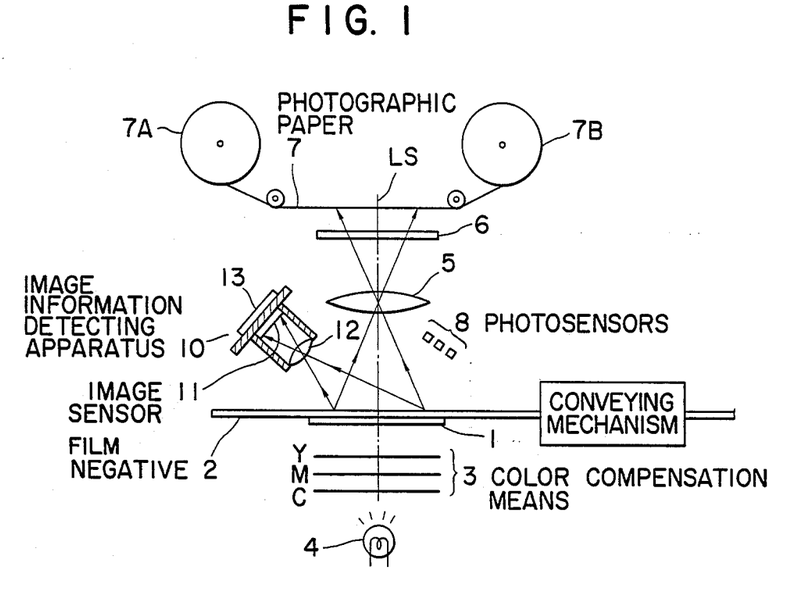
FIG. 1 is a structural view which shows an embodiment of a two-dimensional image sensor applied to an image information detecting apparatus in a photographic printer.

FIG. 1 shows a system which has been proposed by this applicant to solve such problems encountered in the prior art.

A film negative 2 is conveyed by a conveying mechanism 9 to a position on a film negative carrier 1. The negative film 2 is illuminated with the light from a light source 4 via a color compensation means 3 which comprises 3-primary color filters of yellow (Y), magenta (M) and cyan (C). The light transmitted through the film negative 2 is directed to reach a photographic paper 7 via a lens unit 5 and a black shutter 6. The photographic paper 7 is wound around a supply reel 7A and reeled on a take-up reel 7B in synchronism with the movement of the film negative 2. Photosensors 8 such as photodiodes are provided near the lens unit 5 of the film negative 2 in order to detect image density information of three primary colors. In accordance with the detection signals from such photosensors 8, picture printing is carried out. An image information detecting apparatus 10 comprising a two-dimensional image sensor 11 is positioned near the film negative 2 at a position inclined from an optical axis LS of the light source 4 and the film negative 2. A lens unit 12 is provided in front of the two-dimensional image sensor 11 to substantially focus the center area of the film negative 2. On the back of the image information detecting apparatus 10 is attached a substrate board 13 for mounting a processing circuit comprising integrated circuits and so on.

Figure 2:
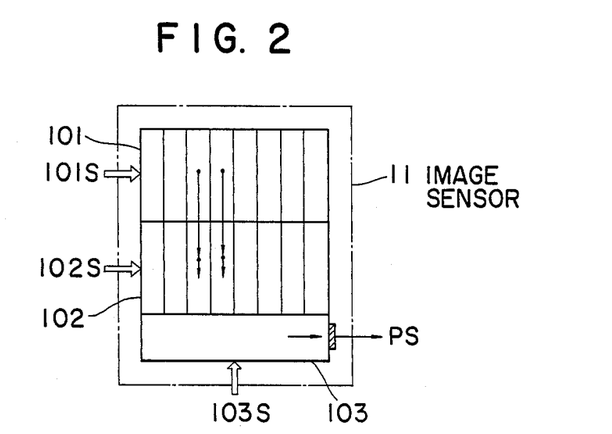
FIG. 2 is a structural view which shows the functions thereof.

The two-dimensional image sensor 11 comprises, as shown in FIG. 2, an image pickup section 101 for optically picking up an image, a storage section 102 for storing charges transmitted from the image pickup section 101, and an output register 103 for outputting the charge stored in the storage section 102. By controlling driving signals 101S through 103S from a driving circuit, the image information in two-dimensions (area) in photoelectrically converted and outputted serially from the output register 103 in the form of an analog image signal PS. The circuit mounted on the substrate board 13 has, for example, a circuit structure shown in FIG. 3. The image sensor 11 is driven by driving signals 101S through 103S supplied from the driving circuit 20. The light illuminating the image pickup section 101 of the image sensor 11 is outputted from the output register 103 as a picture signal PS, sampled and held by a sample-and-hold circuit 21 at a predetermined sampling cycle. The sample value thereof is converted by an analog-to-digital (A/D) converter 22 into digital signals DS. The digital signals DS from the A/D converter 22 are inputted into a logarithmic converter 23 for logarithmic conversion, then converted to density signals DN, passed through a write-in control circuit 24 and finally written in a memory 25.

Figure 3:
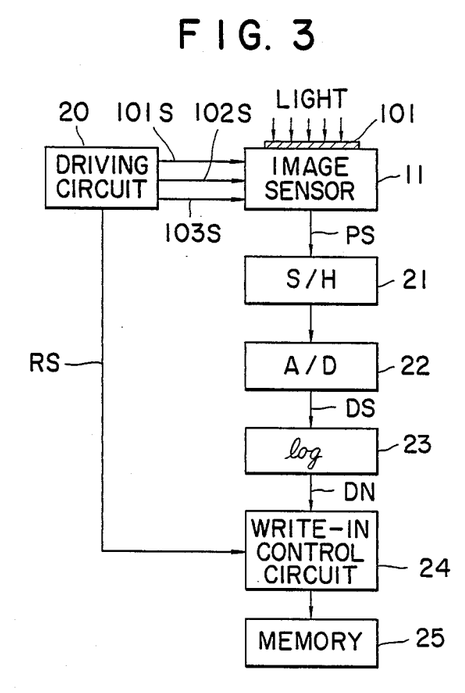
FIG. 3 is a block diagram which shows the control system of the image sensor.

A reading speed signal RS from the driving circuit 20 is inputted into the write-in control circuit 24 in order to read out image information at a predetermined speed when the image sensor 11 is driven. The write-in control circuit 24 writes in the density signals DS at predetermined positions of a memory sequentially and correspondingly with the driving speed of the image sensor 11. In other words, the reading speed of the image sensor 11 is determined by the driving speed. The reading speed in turn determines the segmentation number of picture elements with respect to an image area. The memory 25 should therefore store the detected information in correspondence with the number of pixels, too.

When a picture is printed in a conventional manner in the above mentioned structure, the light transmitted through one frame of a film negative 2 which has been conveyed to and standing still at a printing position is detected by photosensors 8. Then, the filters in the color compensation means 3 are adjusted in response to the picture signals for each of the primary RGB colors and the black shutter 6 is opened to expose a photographic paper 7 with the determined exposure value.

Figure 4A:
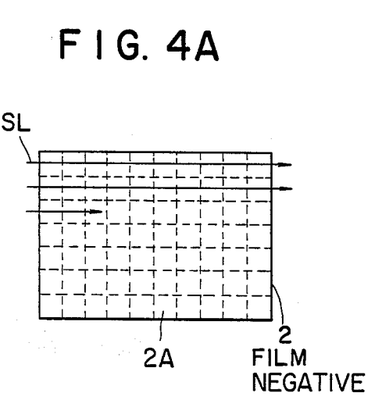
FIGS. 4A and 4B are explanatory diagrams which describes the relationship between pixel segmentation of an original picture frame and stored data.

An image information detecting apparatus 10 comprising a two-dimensional image sensor 11 of the area scanning type such as a CCD is mounted at a position near the film negative 2 at an inclined angle with respect to an optical axis LS to facilitate its mounting. The whole frame of the film negative 2 is segmented into a large number of arrayed pixels for detecting image information. In other words, when predetermined driving signals 101S through 103S are fed from the driving circuit 20 to the image sensor 11, the two-dimensional image sensor 11 is adapted to receive the light transmitted through the film negative 2 on the printing section via the lens unit 12. The two-dimensional image sensor 11 can therefore scan the whole surface of a frame of the film negative 2 along the scanning lines SL sequentially by segmenting the whole area into a large number of small arrayed pixels 2A as shown in FIG. 4A. After the whole area has been scanned, the output register 103 of the image sensor 11 outputs picture signals PS sequentially; then the picture signals PS are sampled and held by a sample-and-hold circuit 21 and the sampled values thereof are converted by an A/D converter 22 into digital signals DS. The digital signals DS from the A/D converter 22 are logarithmically converted by a logarithmic converter 23 to density signals DN. The density signals DN are controlled by a write-in control circuit 24 to be stored in a memory in the arrays corresponding to the pixels 2A shown in FIG. 4B and in terms of the density digital values of the film negative 2.

Figure 4B:
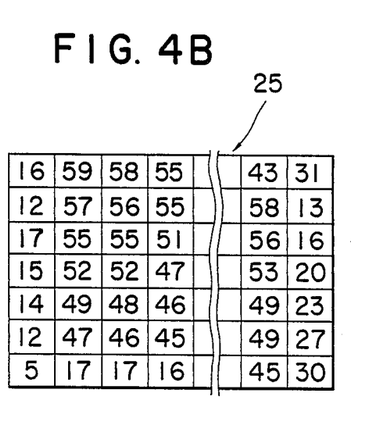

If the digital values for respective pixels of the film negative 2 or the density values for respective pixels with respect to the three primary colors are stored in the memory 25, it is possible to read out the digital values for any particular pixel of the film negative 2 from the memory 25. If the density values for respective three primary colors of R, G and B using mosaic filters (not shown) are stored as shown in FIG. 4B, it is possible to read out such values from the memory for processing (which will be described hereinafter) in order to determine the exposure or correction value for photographic printing in the same manner as in the prior art.

An example of the method for discriminating the size of film negative is described below.

Figure 5:
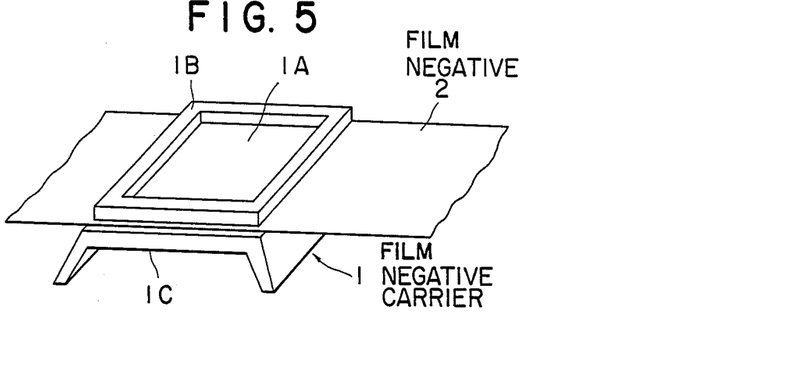
FIG. 5 is a view which shows details of a printing section.
Figure 6A:
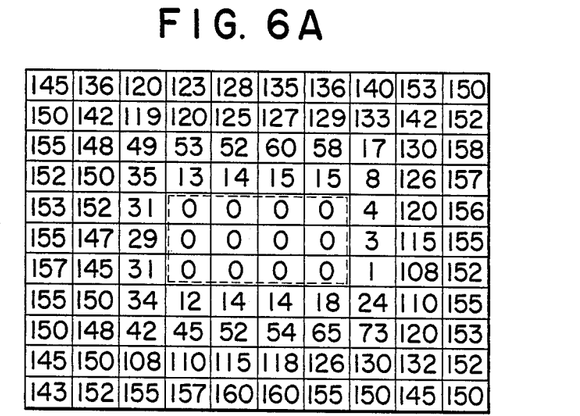
FIGS. 6A and 6B are charts of memories of image data, respectively.
Figure 6B:
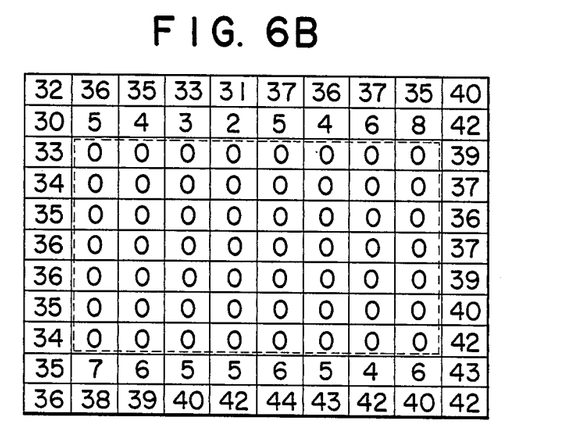

An elongated film negative 2 is conveyed consecutively frame by frame by a conveying mechanism 9 to a position on a film negative carrier 1. As shown in FIG. 5, a rectangular upper guide 1B having a frame aperture 1A is engaged with a lower guide 1C positioned therebelow in order to hold the film negative 2 therebetween for printing the negative film 2 frame by frame. The size of the aperture 1A of the upper guide 1B is completely identical with the size of a frame of the film negative 2 so that the peripheral portion of the frame without an image or unexposed portion would not fall outside the area of the aperture 1A of the upper guide 1B. The area from which the two-dimensional image sensor 11 receives light is determined to correspond not only with one frame of the film negative 2 but also with a larger-sized film. The area includes the portion of the upper guide 1B where the light does not transmit. The image information of the area which the two-dimensional image sensor 11 detects is as shown in FIG. 6A in the case of a film negative carrier of 110 size while it becomes as shown in FIG. 6B in the case of a carrier of a 135 size. FIGS. 6A and 6B show examples of detected image information of the unexposed portion (the developed film portion where no image is pictured) wherein the portion VA encircled by broken lines at the center defines the aperture 1A or the area of a frame. Since the size of a frame corresponds to the size of a film negative 2, the size of an aperture 1A can be obtained by detecting the density "0" which means the transparent portion without image data read by the image sensor 11 and counting the area or the number of zero value pixels. This leads to the discrimination of the size of the film negative 2. In this case, since the optical axis of the image sensor 11 is directed toward the substantial center of the aperture 1A, the size of the film negative 2 can be discriminated by counting the number of pixels having the density "0" (or having the value close thereto) using either hardware or software and comparing the counted value with a predetermined value for each size.

As described above, the size of the film negative 2 is determined by measuring the area of the density "0" and corresponds to the number of pixels, which indicates the size of the aperture 1A of the film negative carrier 1. For example, as shown in FIG. 6A, if the number of pixels of the density "0" is "32" (which may be 30 to 34 for an allowance margin), the size is judged to be the 110 size, as shown in FIG. 6B; if the number is "160" (or 156 to 164 for an allowance margin), the size is judged to be the 135 size, and if the number is "196" to "204", the size is judged to be the 126 size. However, the method of size discrimination is not limited to the above method. The size information judged in the above manner is supplied to the photographic printing system so as to determine the exposure amount by the selection of the applicable formula or by the calculation using a formula related to the photographic printing process in correspondence with the particular film size.

In determining the exposure value, the transmittance of the light of the RGB color components over the whole area is controlled usually at a constant value so as to realize a print with balanced color and exposure. This is based on the empirical rule that the average reflectivity of transmittance of three colors obtained by integration of the whole scene, when an ordinary scene is photographed, is substantially constant. In other words, if a neutral object is photographed by a color film negative, the average LATD varies depending on the exposure amount, the quality of the light from a light source, the sensitivity of the RGB photo-sensitive layers of the color film, the mask used, etc., but those variations can be controlled by making the printing exposure value for R, G and B constant at the time of printing.

The variation in density of the three colors of a color film caused by the difference of color distribution of an object, on the other hand, cannot be controlled appropriately by the above mentioned method because the variation affects the area component ratio among the three colors. In the case where the composition in luminance is quite different from an ordinary distribution, e.g. one having an extremely large area of a high luminance or one with a large area of a low luminance, the LATD cannot be properly controlled by the method of merely controlling the printing exposure value using the average LATD because the variation in density on the film negative is caused by the area-wide variation of the density of the object. Similarly, if the main object of a scene has a shadowed portion or an extremely highlighted portion compared with the surrounding objects, the density cannot be corrected as there are involved conditions extremely different from those preset in the printer. In order to solve such problems in determining the printing exposure value, there have been proposed methods as disclosed in Japanese laid-open Pat. Nos. 23936/1977 and 28131/1979 and Japanese patent publication No. 2691/1981 which segment a frame of a film negative to obtain image information from each segmented portion, and determine the exposure value appropriate to the scene from all the information obtained from respective segments. If it is assumed that the average LATD of a frame is represented by Da, the maximum density of segmented frame by Dmax and the minimum density by Dmin, the exposure value $X_1$ of a 135F size film can be determined by the following equation:

$$X_1 = a1 \cdot Da + b1 \cdot Dmax + c1 \cdot Dmin + d1 \tag{1}$$

The exposure amount $X_2$ of a 110 size film can be determined by the following equation (2):

$$X_2 = a2 \cdot Da + b2 \cdot DMAX + c2 \cdot Dmin + d2 \tag{2}$$

If a correction formula Xs like the one shown below is made available for each film size, any film negative can be printed with a proper exposure value which has been properly corrected for the particular size. Coefficients $K_i$ and $K_j$ are determined separately by experiments for each size respectively.

$$Xs = K_i + K_j \cdot X \qquad (3)$$

When an exposure value is determined or corrected with the information obtained from segments of a frame, there still remains a problem as to how to segment a frame. Another problem lies in that if segmentation method should vary depending on the size of the film, the calculation process becomes complicated. In order to avoid such an inconvenience, this invention enables one to determine the exposure value by means of a segmentation technique common to all sizes using a one-to-one correspondence between the number of segmented areas and the position thereof. More particularly, the above equations (1) and (2) are combined to obtain one common formula as follows:

$$X = a \cdot D_a + b \cdot D_{max} + c \cdot D_{min} + d \qquad (4)$$

Figure 7A:
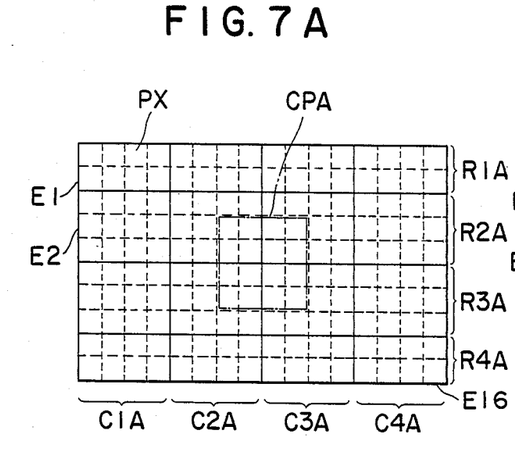
FIGS. 7A through 7E are explanatory charts which describes the relationship between the size of a film frame and exposure amount determination.
Figure 7B:
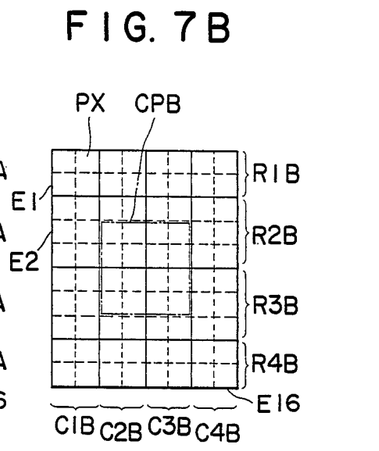
Figure 7C:
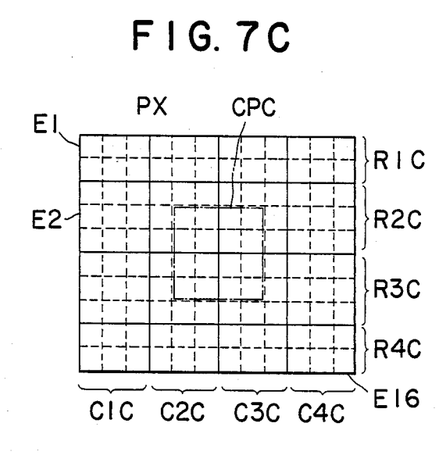
Figure 7D:
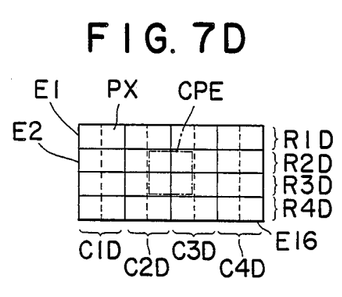
Figure 7E:
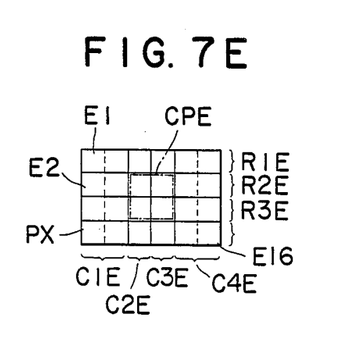

Simultaneously, as shown in FIGS. 7A through 7E, the size of the pixels PX per se which are to be detected by the two-dimensional image sensor 10 is made constant for all the film sizes: a frame of a 135F size film as shown in FIG. 7A is divided into 16 groups, i.e. by four columns into elements C1A through C4A horizontally and into two-column, three-column, three column and two column elements R1A through R4A vertically, and the frame central data is obtained from the central area CP comprising 16 pixels. In a 135 size film as shown in FIG. 7B, a frame is divided into 16 groups by two horizontal columns into elements C1B through C4B and into two-column, three-column, three-column and two-column elements vertically R1B through R4B and the frame central data is obtained from the central area CPB comprising 16 pixels. In a 126 size film as shown in FIG. 7C, a frame is divided into 16 groups by 3 horizontal columns to the elements C1C through C4C and two-column, three-column, three-column and two-column elements vertically R1C through R4C and the frame central data is obtained from the central area CPC comprising 16 pixels. Similarly, a frame of 110 size is divided into 16 groups each of which comprises two horizontal columns and one vertical column (C1D through C4D horizontally and R1D through R4D vertically) and the central area CPD comprises four pixels. The disk size film of FIG. 7E is divided into 16 groups by segmenting a frame into two-column, one-column, one-column, and two-column elements horizontally C1E through C4E and by one vertical column R1E through R4E and the central area CPE comprises four pixels. In this manner, all the frames of respective film sizes are divided into 16 groups E1 through E16 of segments and all the central areas CPA through CPE are defined to include the center of the frame to obtain image information. It is therefore not necessary to change the reading-out area of the image sensor for various film sizes. With only one common equation, a frame can be processed for any film size. One segment area may comprise plural elements; however, it is possible to obtain image information of each segmented area simply by calculating a mean value of each element data. Since the frames of respective film sizes comprise area groups E1 through E16 and the central areas CPi (i=A through E), and since the average information of respective area groups E1 through E16 and CPi can be easily calculated from the data of component elements, the exposure value can be obtained by using the above formula (4) and the obtained exposure value can be corrected properly by the above formula (3), even if the size of each film negative conveyed to the printing section varies.

As described above, in the conventional size detection by means of an image sensor, a film negative carrier is detected without mounting any film negative frame or an unimaged frame and is detected before the start of printing operation. The method has a drawback in that it can not detect the size of a frame for confirmation if the film negative carrier is taken out and mounted again to change the size of a film frame during a continuous printing operation.

Figure 8:
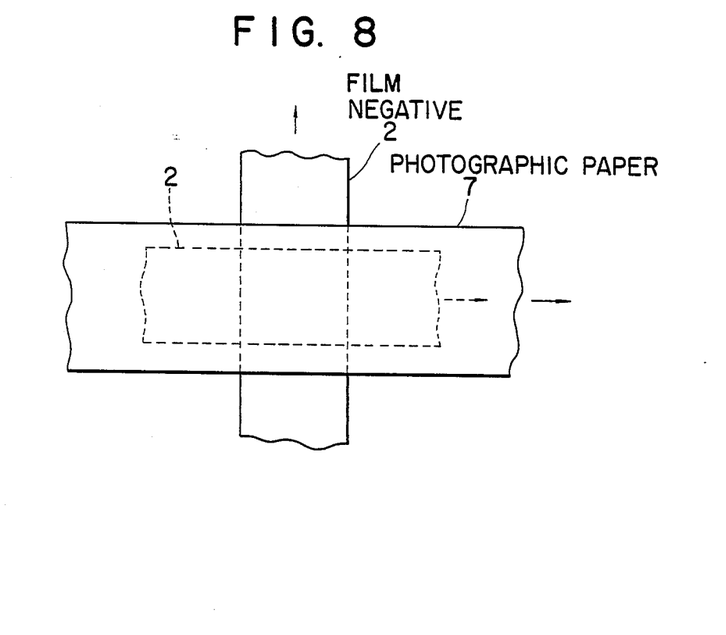
FIG. 8 is an explanatory view which shows how to mount a film frame in the printer.

FIG. 8 shows the photographic printing system wherein a film negative 2 is mounted and advanced in either one of the two directions; i.e. the direction (referred to as "lateral transportation" hereinafter) parallel to the advancing direction of a photographic paper 7 or the direction (referred to as "longitudinal transportation" hereinafter) perpendicular thereto. A film negative other than the size 126 which is square in shape is transported in the system in either one of the aforementioned two transportation directions in order to limit the type of the photographic paper 7 as well as to enhance the efficiency in printing. In this type of printing system where the transportation direction as well as the size of the input frames are frequently switched, however, the above mentioned image information detecting method can not quite accomodate itself to the changes in transporting direction or changes of film negative carriers and often causes errors which waste a large amount of photographic paper.

SUMMARY OF THE INVENTION

This invention was conceived in order to obviate aforementioned defects and aims at providing an image information processing method which is capable of discriminating the size and transportation direction of the frames of an original film, and which processes image signals and detects images for a printing operation efficiently.

Another object of this invention is to provide an image information detecting/processing method which can process image signals during a printing operation without requiring additional input signals from outside; e.g. a status signal of the film negative carrier, and which automatically discriminates the advancing direction of the film frame as well as the size thereof, and detects the errors in setting the size and/or direction.

According to this invention in one aspect thereof, for achieving objects described above, there is provided an image information processing method comprising the steps of: illuminating an original film by a light source; receiving light from an aperture of a film carrier by an image sensor; detecting image information on a whole area of the aperture in segmented pixels; and comparing density values, amount of anti-logarithmic values, number and pattern which are characteristic values of the detected data with stored data; so as to thereby discriminate the size and transporting direction of said original film.

According to this invention in another aspect thereof, there is provided an image information detecting/processing method comprising the steps of: illuminating an original film by a light source; receiving light from an aperture of a film carrier by an image sensor; detecting image information on a whole area including marginal area of frames of said original film in segmented pixels; operating and processing density values, amount of anti-logarithmic values, number and pattern which are characteristic values of the detected data in relation to stored data on another adjacent image frame; and discriminating size and transporting direction of said original film according to the operated data.

The nature, principle and utility of the invention will become more apparent from the following detailed description when read conjunction with the accompanying drawings.

BRIEF DESCRIPTION OF THE DRAWINGS

In the accompanying drawings:

FIGS. 13A through 13F are explanatory charts of this invention.

DESCRIPTION OF THE PREFERRED EMBODIMENTS

This invention is realized by means of the structure identical to the one shown in FIG. 1. The operation thereof will now be described by referring to the flow chart in FIG. 9.

Figure 9:
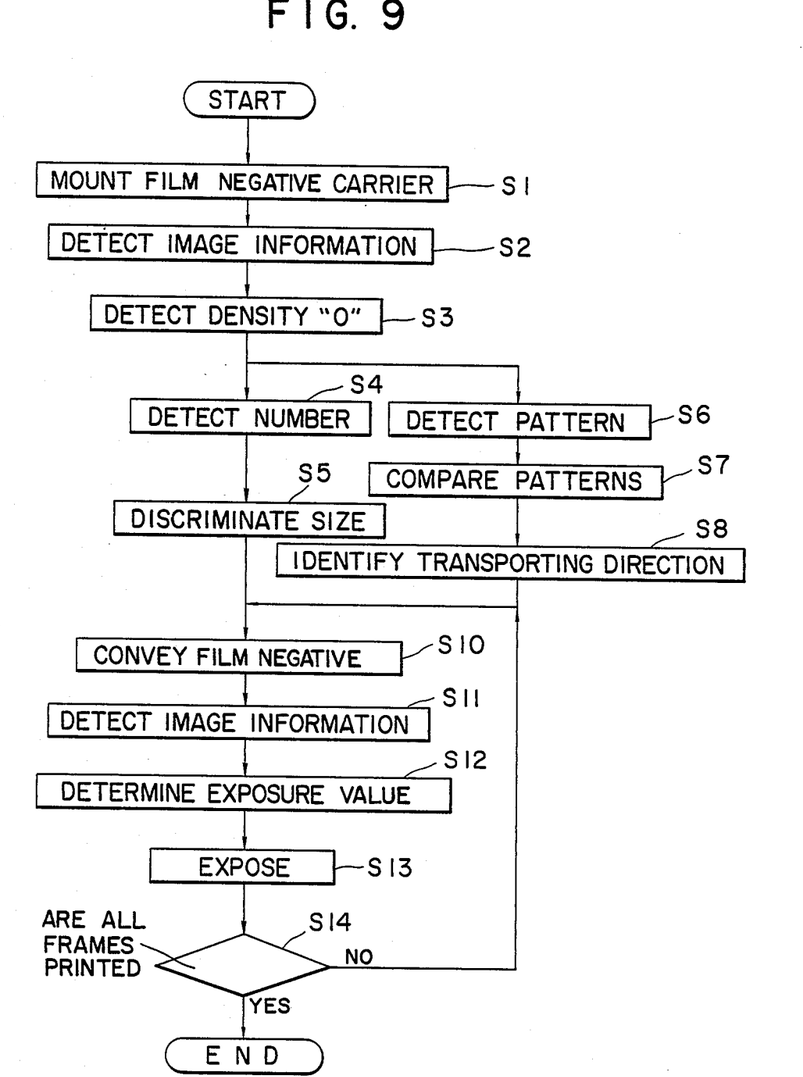
FIG. 9 is a flow chart which explains this invention.
Figure 10A:
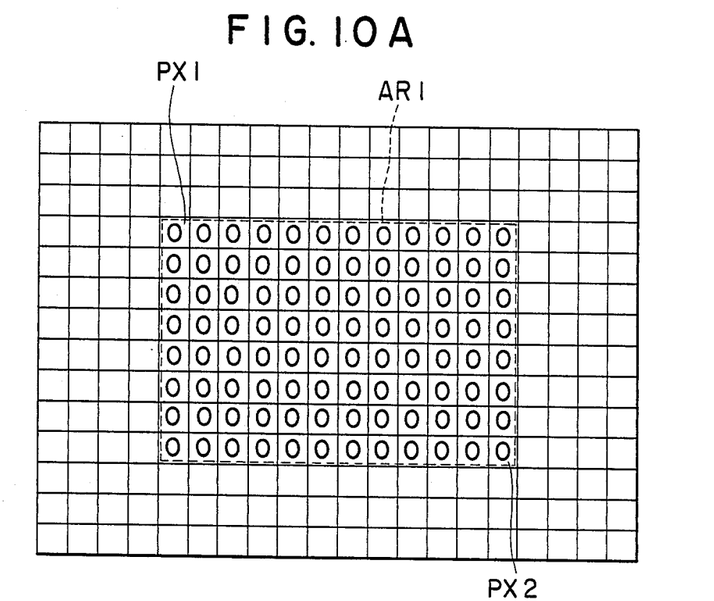
FIGS. 10A and 10B are explanatory charts which shows the operation thereof.
Figure 10B:
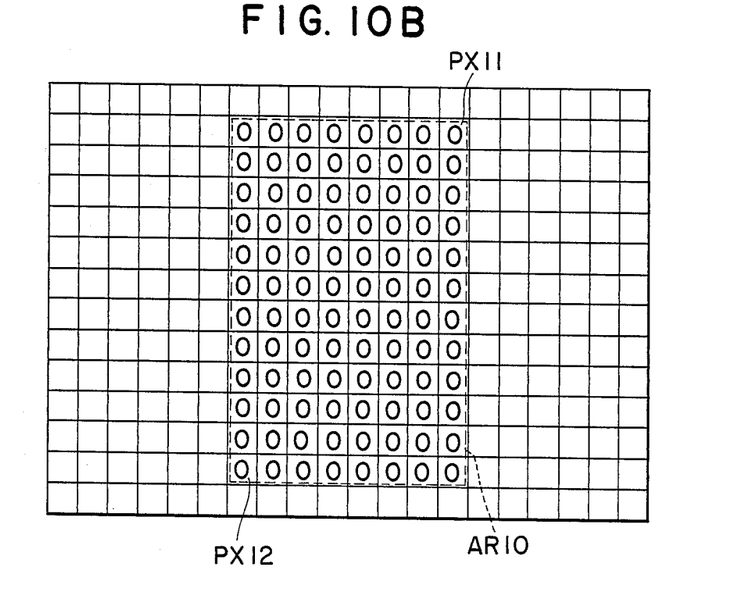

The aforementioned film negative carrier 1 is mounted at a predetermined position in a photographic printing system (Step S1), image information is detected by a two-dimensional image sensor 11 in the image information detecting apparatus (Step S2), the density "0" or a value similar thereto is detected (Step S3), the size of the frame is discriminated by detecting the number of the density "0" subsequently (Step S4 and S5), and comparing the information with a pattern information stored in a memory which is formed with density "0" as shown in FIGS. 10A and 10B (Steps S6 and S7). Since the memory stores the patterns of the lateral transportation shown in FIG. 10A and the longitudinal transportation shown in FIG. 10B for each size, the transportation direction of the film negative 2 can be identified by comparing the detected pattern with the stored information (Step S8). After discriminating the size and the transporting direction of the film negative carrier 1 and hence, that of the film negative 2, the mounted film 2 is conveyed by conveying mechanism 9 (Step S10), and positioned so that a predetermined frame image is disposed at the exposing section, and the frame image is detected by the image information detecting apparatus 10 (Step S11). The information on the frame image are classified in accordance with the information on the size and the direction and the classified data is substituted in the operational expression (4) described above to obtain exposure value (Step S12). The photographic printing system exposes the frame image with thus determined exposure value (Step S13) and the above are repeated until all of the frames are printed.

For instance, image information of 135 size film may be detected in the area AR1 encircled with the broken line in FIG. 10A if the frame is mounted horizontally or in a lateral transportation direction, or in the area AR10 encircled with the broken line in FIG. 10B if it is mounted vertically or in a longitudinal transportation direction. If all the detected pixel data are recognized by table conversion and other techniques in the memory 25 in a manner corresponding to the data on the pixels PX1 and PX2 of the area AR10, the operational expression (4) may be used for both transporting directions. As described referring to FIGS. 7A through 7E, the expression (4) can be used irrespective of the film size. This single operational expression may be used without modification even if the size or the transporting direction of the film frame changes. The operational expression may be divided into a expression for determining the basic exposure value and one for determining a correction value. Similarly, the exposure value determining expression for a frame advancing in the lateral transportation direction may be provided separately from the one for the longitudinal transportation direction and is selected in accordance to the result of the discrimination.

Figure 11:
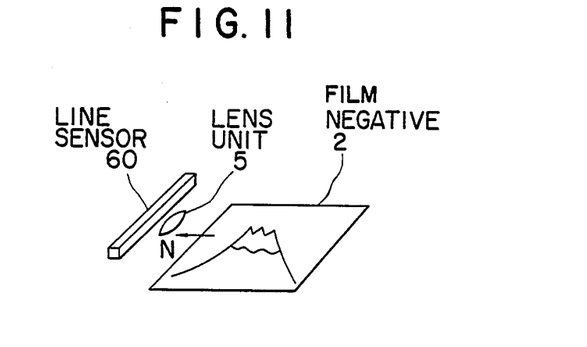
FIG. 11 is a view of another embodiment of image information detection according to this invention.

Although image information is detected by the two-dimensional image sensor in the above embodiment, it may be detected by a one-dimensional line sensor 60 which is positioned at the aperture of the film negative carrier as shown in FIG. 11 by moving the sensor or carrier (scanning) in relation to the aperture. Although two-dimensional information is detected from almost all of the frame images in the foregoing description, it may be detected by scanning and detecting the difference or ratio between the one-dimensional information on one lateral line and that on one vertical line perpendicular thereto of the film carrier aperture to obtain a similar effect. The result of discrimination for the image information detecting apparatus may be automatically compared to the set printing conditions for the photographic printer and if they do not correspond, the operator may be alerted with a buzzing sound or alarm.

In the foregoing description, the discrimination of the size and the transporting direction of the film is described in relation to the case where no film negative is mounted on the film carrier or a film negative is mounted but the frame of the film is not imaged. In practice, however, the minimum density or the maximum density seldom continues regularly in a frame image. The image data is converted, if necessary, into binary values in groups consisting of a few frames during a continuous printing operation to be discriminated by the above method. This invention method can prevent waste of photographic paper or time which might otherwise be caused be erroneous mounting as since this method enables automatic comparison of the size and the transporting direction of the film frames which are being mounted in the photographic system with the stored reference data and can give an alarm if they are not identical.

As described in detail in the foregoing statement, this invention allows a fast and accurate printing operation since it is capable of detecting image information not only within film frames but also in the marginal areas of the film negative with the image sensor, discriminating the size and the transporting direction of the film frames from density values of pixel segments of the frames without necessitating an additional detector dedicated for this purpose, for instance, a microswitch, and determining the exposure value. This invention enhances the speed of exposure value determination and facilitates the operation thereof since detected information in this method is classified in accordance with the transporting direction and size of the film frames and a single operational expression can be used for determining the exposure value on all occasions.

Erroneous combination of the size of the film frame with the transporting direction thereof can be detected in advance by automatically comparing discrimination information with the predetermined printing conditions in this method and the operator is alerted by an alarm.

FIGS. 12A and 13A through 13F show another embodiment of this invention.

Figure 12A:
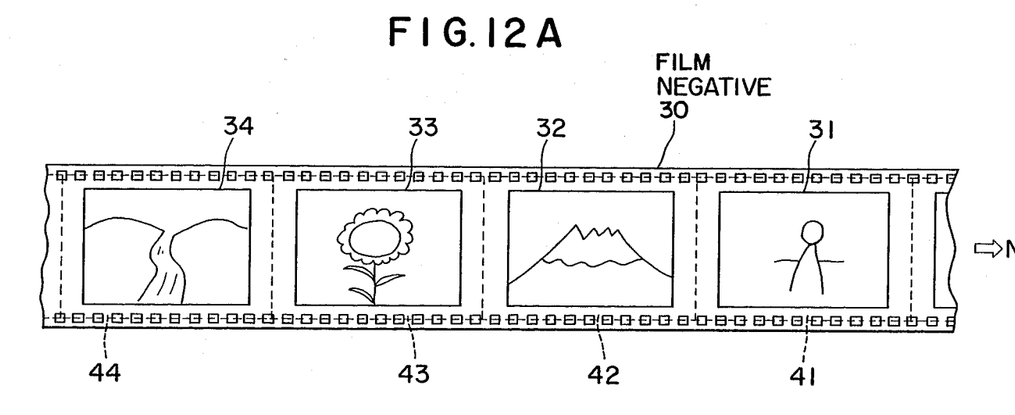
FIGS. 12A and 12B are explanatory views of another embodiment according to this invention.
Figure 13C:
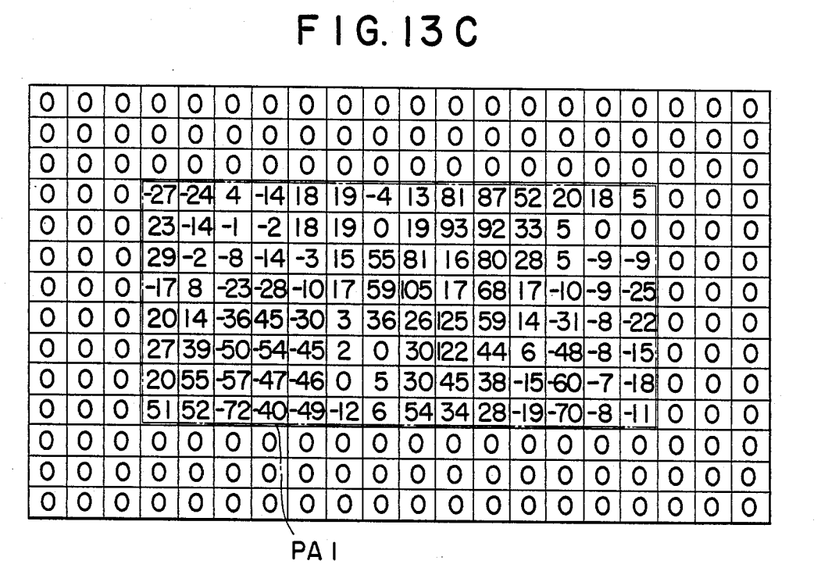

This embodiment is adapted to respectively detect image frames 31 through 34 with an image sensor in areas 41 through 44 as shown in FIG. 12A wherein a film negative 30 is being advanced in the direction N. The image information of the area 41 of the image frame 31 are stored in a memory; the image information of the area 42 of an adjacent frame 32 are detected and then subtracted from the information on the area 41. The area (size), and the direction of the longer side and of the shorter side of a pixel corresponding to the area of which density is detected as not "0" (or the values near "0"). In obtaining the difference in detected information between two adjacent frames, the difference on the marginal areas each outside the frame becomes "0" if the two frames are of the same size and are moving toward the same direction as since the image information attached on these areas are constant. The difference between two adjacent frames within the frames will not be "0" since images of one frame usually differ from those in the next frame. Judging from such a relationship, it is possible to obtain image information which have the relationship opposite to the one shown in FIGS. 6A and 6B and discriminate the size and the transporting direction of the film negative 30. In other words, in case the image information on the detection area 41 of the frame 31 is as shown in FIG. 13A while those of the area 42 of the frame 32 is as shown in FIG. 13B, the difference between the above two becomes as shown in FIG. 13C to make the values appear only in the area PA1 of the frames 31 and 32. Other areas show the value "0". As FIG. 13C shows the relationship opposite to the one shown in FIGS. 6A and 6B, the values "0" and other values are inverted, and compared with the reference value set in advance to discriminate the size of the imaged frame or the film frame. The transporting direction of the film negative 30 can also be discriminated by converting absolute values of the image information which cross perpendicularly at the center of the image sensor into binary values with "0" as a threshold value, comparing the difference between the value and the number of "1" in the lateral row PHN with the difference between the value and the number of "1" in the vertical row PHV. More particularly, when the relationship is PHN>PVN, the transporting direction of the film is judged as the lateral transportation direction, and if the relationship is PHN<PVN, it is judged as the longitudinal transportation direction. Alternatively, the size and the transporting direction of the film negative 30 may be discriminated by comparing PHN or PVN with the reference values or the reference patterns which are stored in advance. The difference in image information between adjacent frames is sequentially obtained and the size of the areas outside the area of "0" is detected in the above manner. The size and the transporting direction of the film negative can be discriminated by processing the signals obtained as voted above, and if the discriminated result is contradictory to the reference values in size and transporting direction, an alarm may be outputted to alert the operator.

Figure 12B:
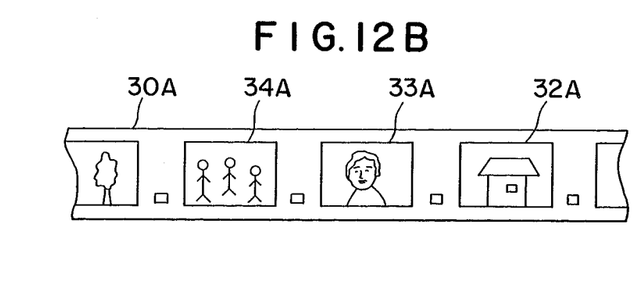
Figure 13D:
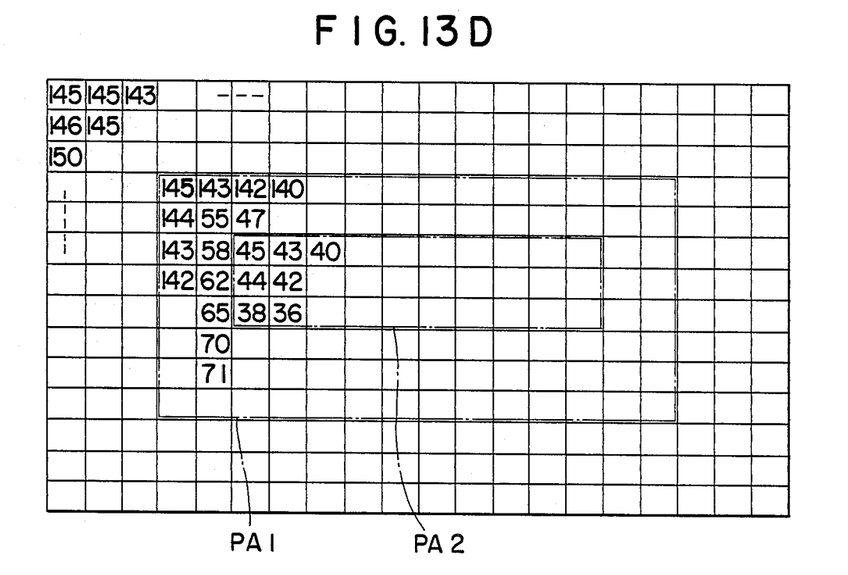
Figure 13E:
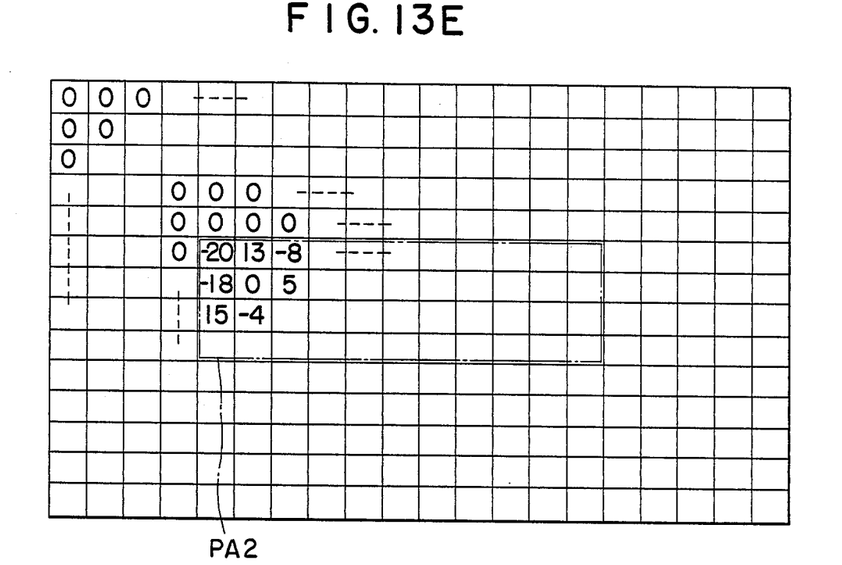
Figure 13F:
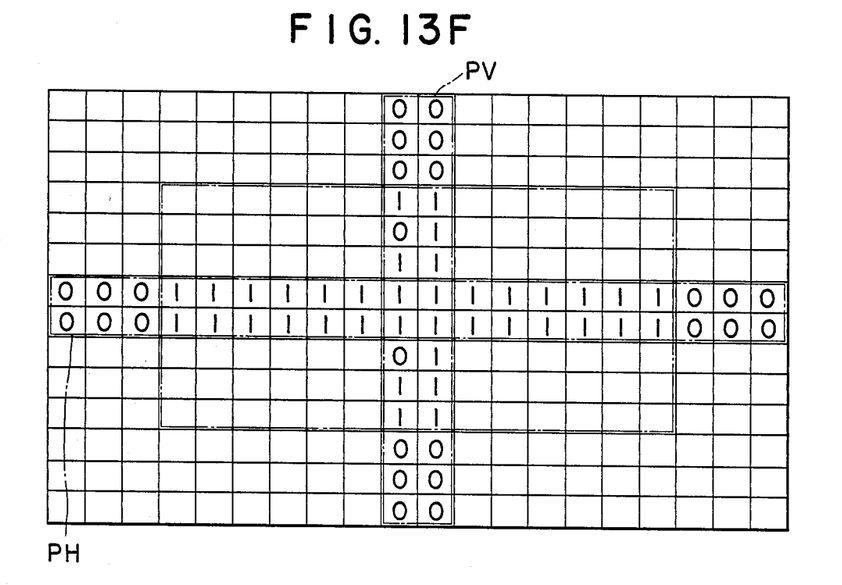

As shown in FIG. 12A, when an image frame 32 of 135F size film is followed by a different size film negative on a film carrier, and as shown in FIG. 12B, if an image frame 33A of 110 size film is conveyed for printing, the image information detected by the image sensors become as shown in FIG. 13D. By this step, even if the difference between the above result and the image information of the previous image frame 32 is taken, the areas other than that of "0" will be the same as those identified by the comparison between image frames 31 and 32, and therefore the size and the transporting direction can not be discriminated. The image information on the area 43 corresponding to the image frame 33A is stored in a memory. At the next step, image of the detected area 44 corresponding to the image frame 34A is detected and the difference from the stored data of the area 43 is obtained. Then, all of the areas other than the area PA2 become "0" as shown in FIG. 13E, thereby identifying the change in size. Similarly, the stored images detected by the size detection method by means of the prior art image sensors may be set as the reference frame images, and compared in operational processing with the image data of the area corresponding to the image frame which is to be printed to identify the size and the transporting direction of the film negative.

The previous description has been given by referring to the detection using difference between stored values as shown in FIGS. 13A through 13E, but the ratio of stored values as anti-logarithmic values may be used for the same purpose. The combination of comparative frames may arbitrarily be determined. Moreover, if similar scenes continue to make discrimination difficult, the detection may be repeated several times sequentially. The present invention is explained in the foregoing concerning application for photographic printing systems, but is is applicable to other recording media such as magnetic tapes, optical tapes, magnetic disc films, etc. using similar techniques.

As described in detail in the foregoing statement, this invention can detect image information on the areas not only frame images but marginal areas with the image sensor and compare image information of a pixel segment with that of the adjacent pixel or with that of reference frame, a frame being segmented into a large number of pixels, so that the size and the transporting direction of an original film are discriminated to enhance speed and precision of printing operation.

This invention further is effective in preventing errors in selection of channels, determination of size and transporting direction or mounting of the film negative carrier as the obtained data is compared with the set data. When the data is not in agreement, an alarm is outputted to alert the operator. This invention therefore can prevent the waste of photographic paper, processing agents or time which might otherwise be caused.

It should be understood that many modifications and adaptations of the invention will become apparent to those skilled in the art and it is such obvious modifications and changes are intended to be encompassed by the scope of the claims appended hereto.

What is claimed is:

1. An image information processing method comprising the steps of:
    illuminating an original film by a light source;
    receiving light from an aperture of a film carrier by an image sensor;
    detecting image information on a whole area of the aperture in segmented pixels; and
    comparing a characteristic value of the segmented pixel image information with corresponding stored data;
    and discriminating a size and transporting direction of said original film based on the comparison of the characteristic value with the stored data.

2. An image information processing method as claimed in claim 1, wherein said image sensor is a two-dimensional image sensor.

3. An image information processing method as claimed in claim 1, wherein said image sensor is a one-dimensional line sensor which is adapted to move in relation to and above the aperture.

4. An image information processing method as claimed in claim 1, wherein said transporting direction of the original film is discriminated by lateral or longitudinal direction.

5. An image information processing method comprising the steps of:
    illuminating an original film by a light source;
    receiving light from an aperture of a film carrier by an image sensor;
    detecting image information on a whole area of the aperture in segmented pixels;
    comparing a characteristic value of the segmented pixel image information with corresponding stored data;
    discriminating size and transporting direction of said original film according to the compared result;
    sorting out said segmented pixel image information in accordance with the result of the discrimination; and
    selecting one of a plurality of operational expressions for determining an exposure value which are stored in advance in a memory.

6. An image information processing method as claimed in claim 5, wherein said transporting direction is horizontal or vertical.

7. An image information processing method as claimed in claim 5, wherein said operational expressions for determination of exposure values includes an operation expression for determination of a correction value.

8. An image information detecting/processing method comprising the steps of:
    illuminating an original film by a light source;
    receiving light from an aperture of a film carrier by an image sensor;
    detecting image information on a whole area including marginal area of frames of said original film in segmented pixels;
    operating and processing a characteristic value of the segmented pixel image information in relation to corresponding stored data on a reference frame; and
    discriminating size and transporting direction of said original film according to the operated and processed characteristic value of the segmented pixel image information.

9. An image information detecting/processing method as claimed in claim 8, wherein said image sensor is a two-dimensional image sensor.

10. An image information detecting/processing method as claimed in claim 8, wherein said image sensor is a one-dimensional line sensor which is adapted to move in relation to and above imaged frames.

11. An image information detecting/processing method as claimed in claim 8, wherein said transporting direction is discriminated by horizontal or vertical direction.

12. An image information detecting/processing method comprising the steps of:
    illuminating an image frame of an original film by a light source;
    receiving light from the image frame by an image sensor;
    detecting image information on a whole area including a marginal area of the image frame in segmented pixels;
    operating and processing one density value or a plurality of anti-logarithmic density values which are characteristic values of the segmented pixel image information in relation to corresponding stored data on a reference frame; and
    discriminating size and transporting direction of said original film according to the operated and processed one density value or plurality of anti-logarithmic density values which are characteristic values of the segmented pixel image information.

13. An image information detecting/processing method as claimed in claim 12, wherein said image sensor is a two-dimensional image sensor.

14. An image information detecting/processing method as claimed in claim 12, wherein said image sensor is a one-dimensional line sensor which is adapted to move in relation to and above imaged frames.

15. An image information detecting/processing method as claimed in claim 12, wherein said transporting direction is discriminated by horizontal or vertical direction.

* * * * *